United States Patent
Wu et al.

(10) Patent No.: US 8,570,726 B2
(45) Date of Patent: Oct. 29, 2013

(54) FOLDABLE KEYBOARD

(75) Inventors: Wei Wu, Shenzhen (CN); Xin Yang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 118 days.

(21) Appl. No.: 13/195,028

(22) Filed: Aug. 1, 2011

(65) Prior Publication Data

US 2012/0170198 A1   Jul. 5, 2012

(51) Int. Cl.
*H05K 7/00* (2006.01)
*H03K 17/94* (2006.01)

(52) U.S. Cl.
USPC .......................... 361/679.15; 345/168; 341/22

(58) Field of Classification Search
USPC .............. 361/679.01–679.02, 679.08–679.2, 361/679.55–679.58; 400/682, 82, 691, 692, 400/693, 488, 489; 341/22; 345/168; 364/708.1
See application file for complete search history.

(56) References Cited

U.S. PATENT DOCUMENTS

| 7,663,879 | B2 * | 2/2010 | Richardson et al. ..... 361/679.56 |
| 2005/0002158 | A1 * | 1/2005 | Olodort et al. ................ 361/683 |
| 2010/0176698 | A1 * | 7/2010 | Wu et al. .................... 312/223.1 |

\* cited by examiner

*Primary Examiner* — Zachary M Pape
*Assistant Examiner* — Douglas Burtner
(74) *Attorney, Agent, or Firm* — Altis & Wispro Law Group, Inc.

(57) ABSTRACT

A foldable keyboard includes a main body, a first hinge portion and a locking element. The first hinge portion is mounted on a middle position of the main body. The locking element includes a locking portion mounted on the main body, a limiting portion mounted on the main body, and for receiving the locking portion, and a controlling portion mounted on the main body, and being received into the limiting portion. The main body is folded along the first hinge portion. The locking portion is engaged in the limiting portion to lock the foldable keyboard in a folding state. The controlling portion unlocks the foldable keyboard from the folding state.

12 Claims, 8 Drawing Sheets

FOLDABLE KEYBOARD

BACKGROUND

1. Technical Field

The present disclosure relates to keyboards and, particularly, to a foldable keyboard which can be easily carried by a user.

2. Description of Related Art

Conventional foldable keyboards usually include a main body including a number of keys mounted thereon. The main body is foldable to reduce the size of the foldable keyboard, and it is convenient for a user to put the folded keyboard into a pocket. However, during folding the main body, each key may bind against, or crush, resists another key; it is easy to damage the keys, thereby damaging the foldable keyboard.

Therefore, what is needed is a foldable keyboard to overcome the described shortcoming.

DETAILED DESCRIPTION

Figure 1:
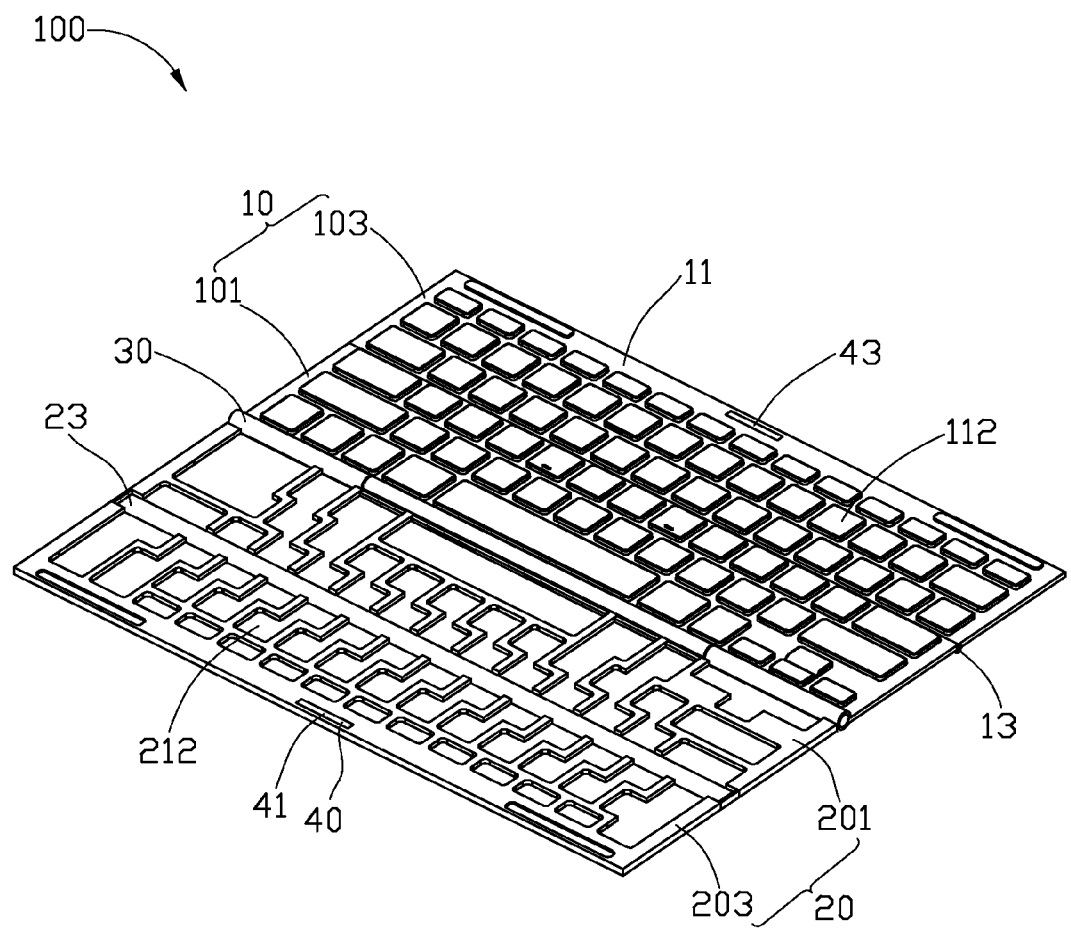
FIG. 1 is an isometric view of a foldable keyboard in accordance with an exemplary embodiment.
Figure 2:
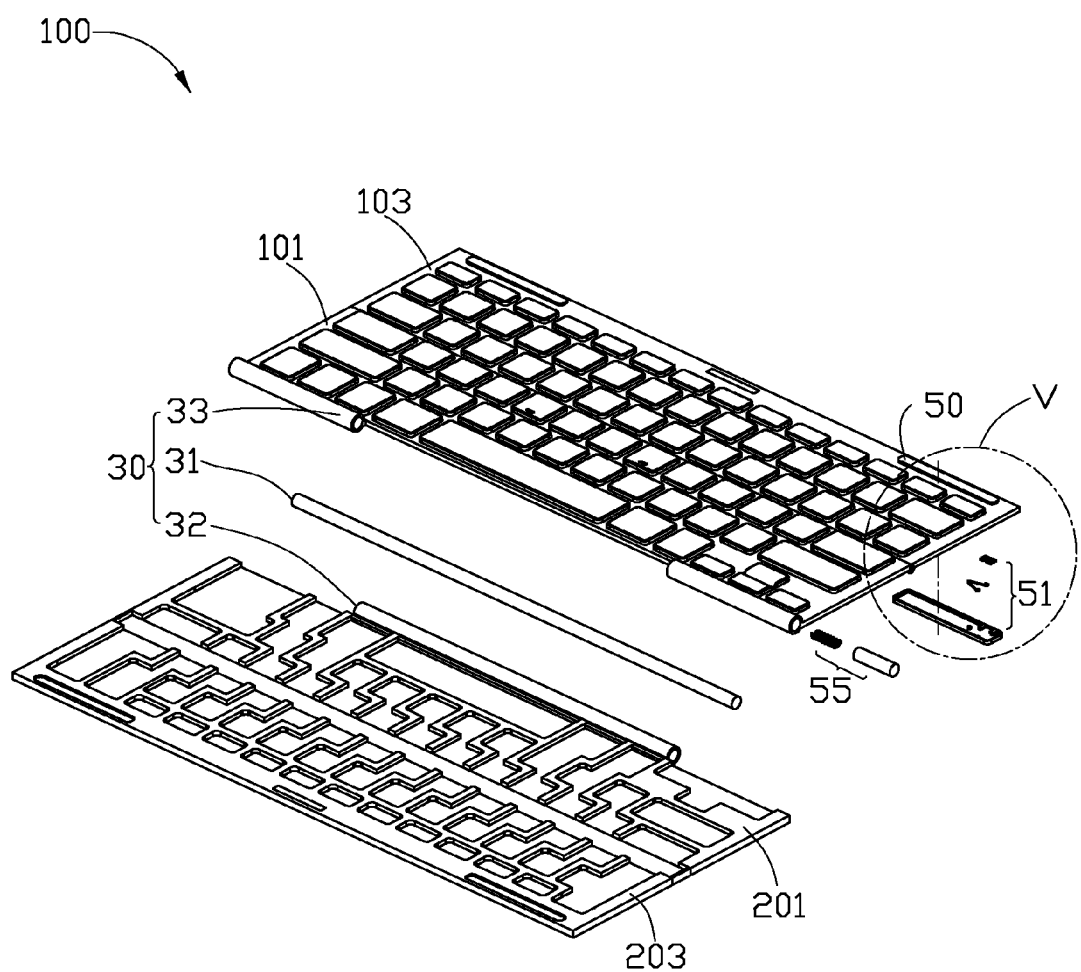
FIG. 2 is an exploded view of the foldable keyboard of FIG. 1.

Referring to FIGS. 1-2, an embodiment of a foldable keyboard 100 is provided. The foldable keyboard 100 includes a main body 10, a cover 20, a hinge portion 30 rotatably connected the cover 20 to the main body 10, a fixing element 40, and two locking elements 50 mounted on two opposite sides of the foldable keyboard 100. The cover 20 is rotated around the hinge portion 30 manually to cover the main body 10, and is engaged on the main body 10 by the fixing element 40, thereby locking the foldable keyboard 100 in a first folding state. After the cover 20 is engaged with the main body 10, the foldable keyboard 100 can be folded again, and is locked in a second folding state by the two locking elements 50.

The hinge portion 30 includes a shaft 31, a first sleeve 32, and two second sleeves 33 mounted on the two ends of the main body 10. The first sleeve 32 is rotatably placed over a middle portion of the shaft 31, and the two sleeves 33 are rotatably placed over the two ends of the shaft 31, thereby rotatably connecting the cover 20 with the main body 10.

The main body 10 includes a key portion 11. The key portion 11 includes a number of keys 112 which are used to receive user input. The cover 20 defines a number of receiving grooves 212 aligned with the number of the keys 112. When the cover 20 is rotatably engaged on the main body 10, the number of keys 112 is received in the corresponding receiving grooves 212, thereby preventing the key portion 11 from being damaged.

The foldable keyboard 100 further includes a first hinge portion 13 set in a middle position of the main body 10, and a second hinge portion 23 set in a middle position of the cover 20. The main body 10 can be folded to form two half-bodies (two sub-main bodies 101 and 103) along the first hinge portion 13. The cover 20 can be folded to form two half-covers (two sub-covers 201 and 203) along the second hinge portion 23.

Figure 3:
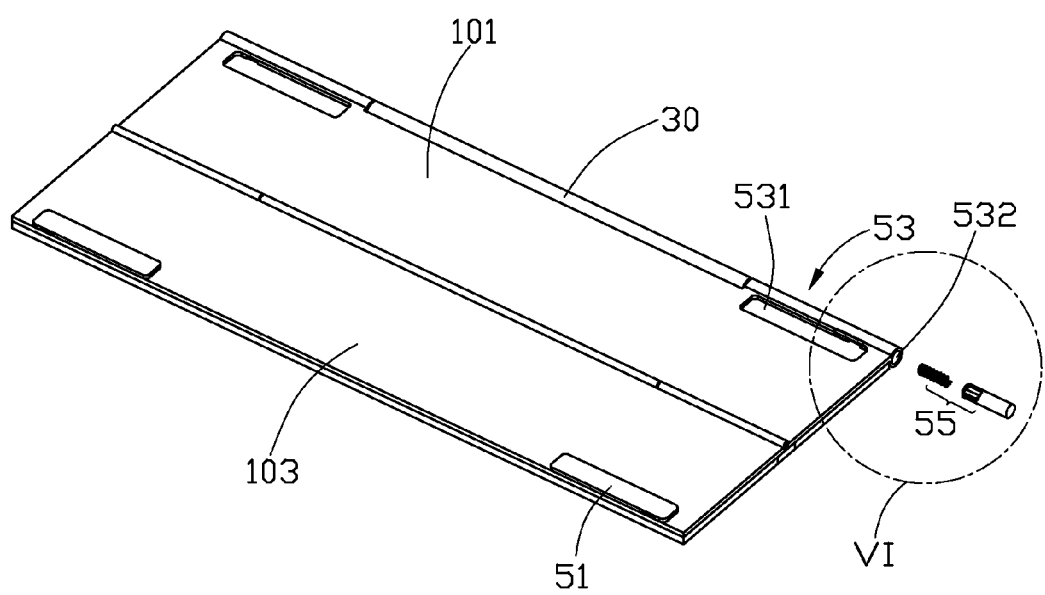
FIG. 3 shows the foldable keyboard of FIG. 1 folded at a hinge portion.
Figure 4:
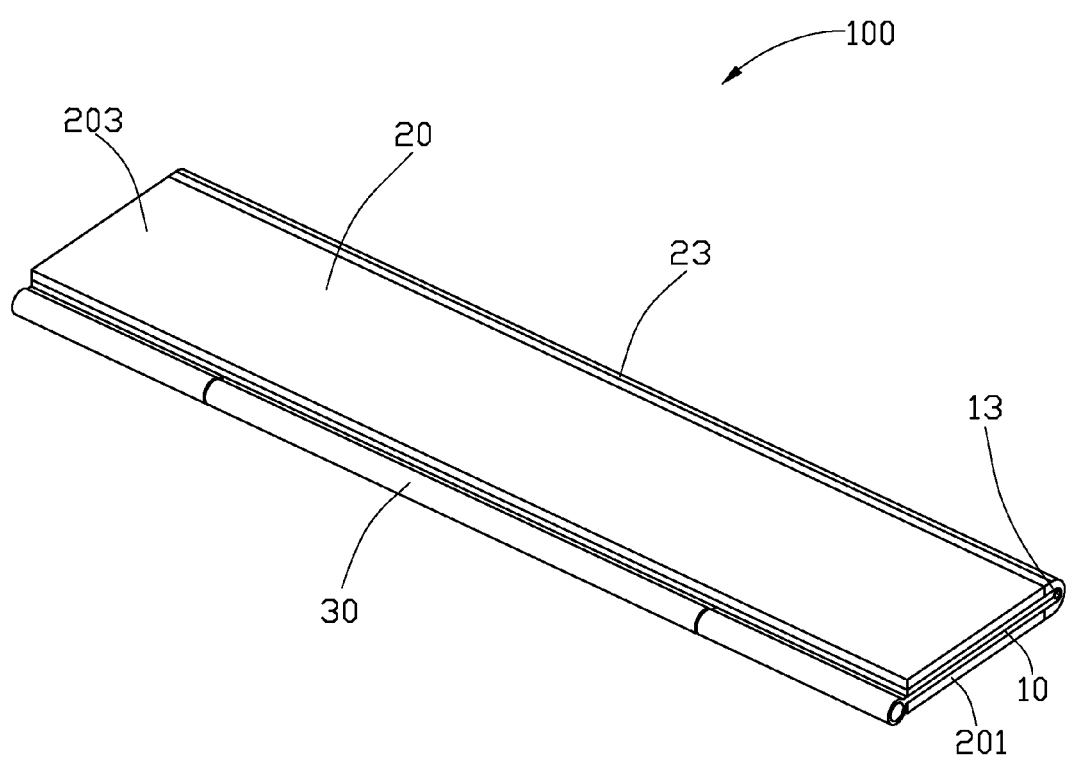
FIG. 4 shows the foldable keyboard of FIG. 3, further folded at another hinge portion.

Referring also to FIGS. 3-4, after the cover 20 is rotatably engaged on the main body 10, the foldable keyboard 100 can be folded again along the first hinge portion 13 and the second hinge portion 23, thereby locking the foldable keyboard 100 into the second folding state. In one embodiment, the cover 20 is made of flexible material, thereby providing handling comfort for user.

The fixing element 40 includes a magnet 41 mounted on one side of the cover 20 away from the hinge portion 30, and a metal sheet 43 mounted on one side of the main body 10 and aligned with the magnet 41. When the cover 20 is rotatably engaged on the main body 10, the magnet 41 attracts the metal sheet 43 to secure the cover 20 on the main body 10.

The two locking elements 50 are configured to lock the two sub-main bodies 101 and 103 together, and to lock the two sub-covers 201 and 203 together, thereby locking the foldable keyboard 100 in the second folding state.

Each of the two locking elements 50 includes a locking portion 51, a limiting portion 53, and a controlling portion 55 for limiting the locking portion 51 within the limiting portion 53. The limiting portion 53 and the controlling portion 55 are mounted on one side of the main body 10 adjacent to the hinge portion 30. The locking portion 51 is mounted on the far side of the main body 10, away from the hinge portion 30.

Figure 5:
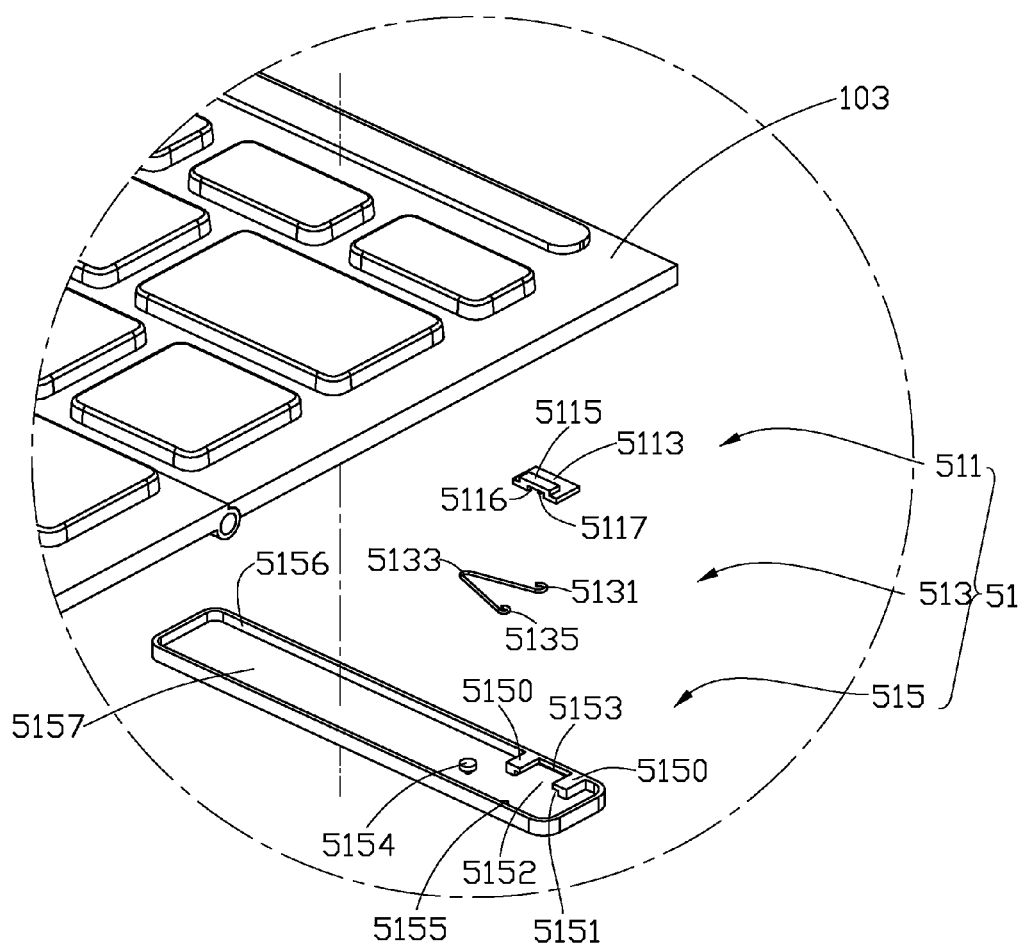
FIG. 5 is an enlarged view of the circled portion V of FIG. 2.

Referring also to FIG. 5, the locking portion 51 is mounted on the main body 10, on the reverse of the key portion 11 surface, and includes a sliding block 511, a fixing portion 515, and a first elastic element 513 for elastically connecting the sliding block 511 to the fixing portion 515. In one embodiment, the first elastic element 513 is a spring.

The sliding block 511 is stepped, and includes a bottom 5113, a stopper 5115 protruding from a portion of the bottom 5113, a recessed portion 5116 defined in the stopper 5115, and a first pin 5117 mounted in the recessed portion 5116. The sliding block 511 is made of magnetic material, in one embodiment, the sliding block 511 is a magnet.

The fixing portion 515 includes a groove 5157, two sliding tracks 5150, a slot 5153 defined in a sidewall 5156 of the groove 5157 between the two sliding tracks 5150, a second pin 5154, and a third pin 5155.

The two sliding tracks 5150 provide a slideway for the sliding block 511. The two sliding tracks 5150 protrude from a bottom of the groove 5157, and connect to the sidewall 5156 of the groove 5157. A first receiving space 5152 is defined between the two sliding tracks 5150. A sidewall of the sliding track 5150 is recessed to form a second receiving space 5151 communicating with the first receiving space 5152. The sliding block 511 is placed between the two sliding tracks 5150, the stopper 5115 is placed in the first receiving space 5152, and the two ends of the bottom 5113 are placed in the two second receiving spaces 5151, thereby slidably connecting the sliding block 511 to the two sliding tracks 5150.

The second pin 5154 and the third pin 5155 are mounted on the bottom of the groove 5157, and cooperate with the first pin 5117 to form a triangle. The first elastic element 513 includes a first fixing end 5131, a second fixing end 5133, and a third fixing end 5135. The first fixing end 5131 is fixed to the first pin 5117, the second fixing end 5133 is fixed to the second pin 5154, and the third fixing end 5135 is fixed to the third pin 5155, thereby elastically connecting the sliding block 511 to the fixing portion 515.

An external magnetic force can attract the sliding block 511 towards the slot 5153, until a portion of the bottom 5113 passes through the slot 5153, and the stopper 5115 butts against the sidewall 5156. During a movement of the sliding block 511, the first elastic element 513 is deformed, to rebound and drive the sliding block 511 to return to an original position when the external magnetic force is removed.

Figure 6:
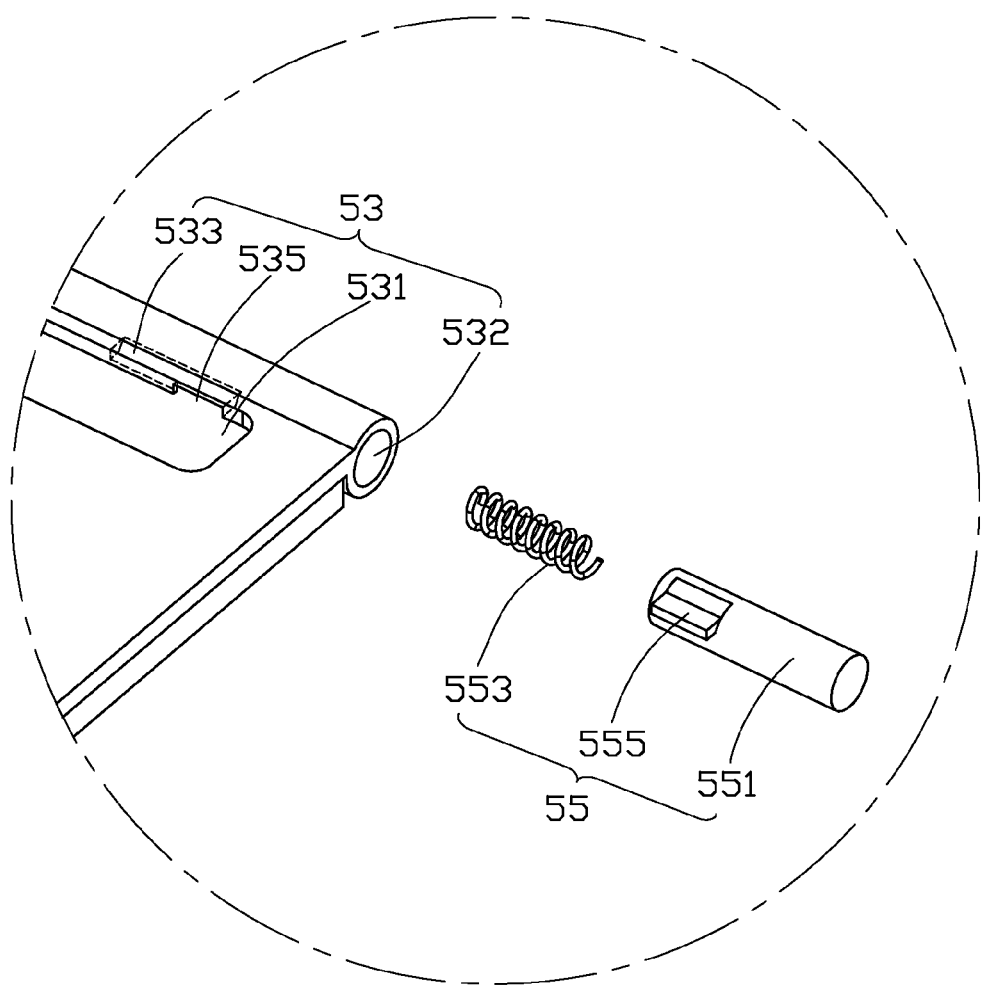
FIG. 6 is an enlarged view of the circled portion VI of FIG. 3.

Referring also to FIG. 6, the limiting portion 53 includes a recessed portion 531 on the surface of the main body 10 for receiving the locking portion 51, and a receiving chamber 532 for receiving the controlling portion 55. The recessed portion 531 and the locking portion 51 are coplanar. A limiting slot 535 is defined in a sidewall of the recessed portion 531 adjacent to the hinge portion 30, and communicates with the slot 5153.

The receiving chamber 532 is defined in one end of the second sleeve 33 away from the first sleeve 32. A sliding groove 533 is defined within the receiving chamber 532.

The controlling portion 55 includes a button 551, a magnet 555, and a second elastic element 553. The second elastic element 553, the magnet 555, and the button 551 are placed in that order in the receiving chamber 532. The magnet 555 may be slid along the sliding groove 533 by the button 551 and the second elastic element 553. In one embodiment, the second elastic element 553 is a spring.

Figure 7:
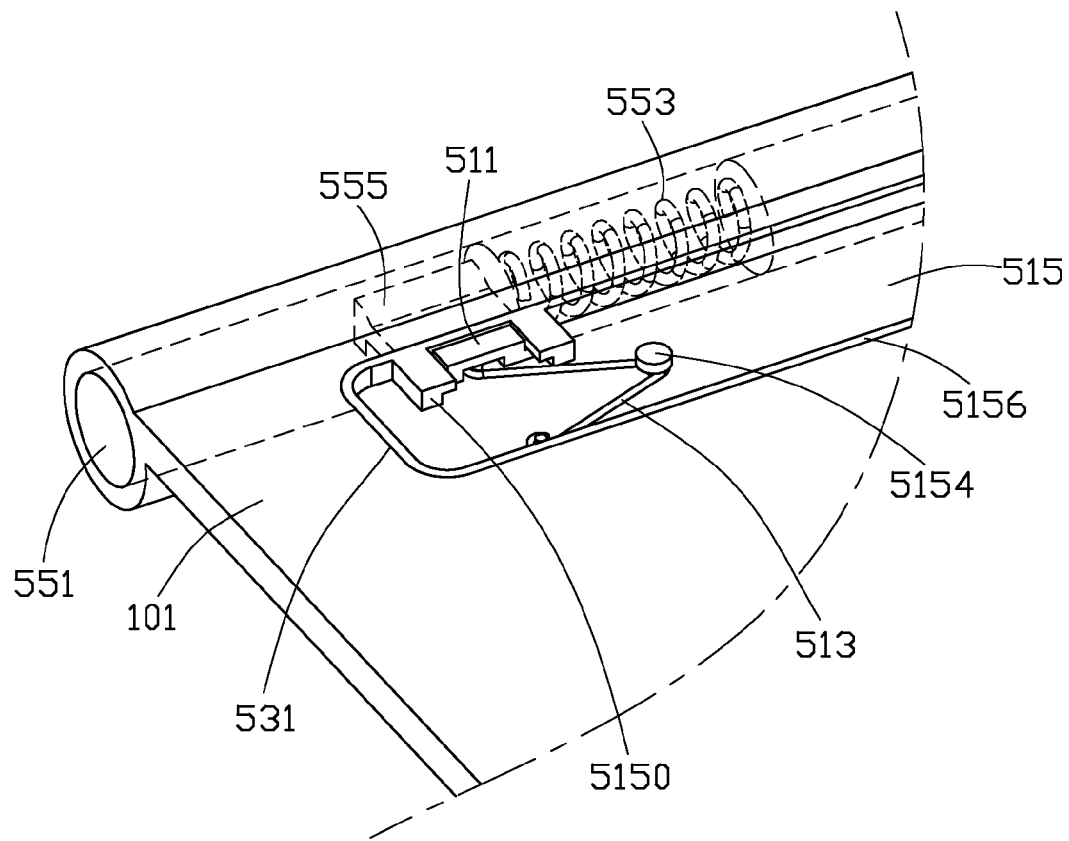
FIG. 7 shows the foldable keyboard of FIG. 4, locked by a locking element.
Figure 8:
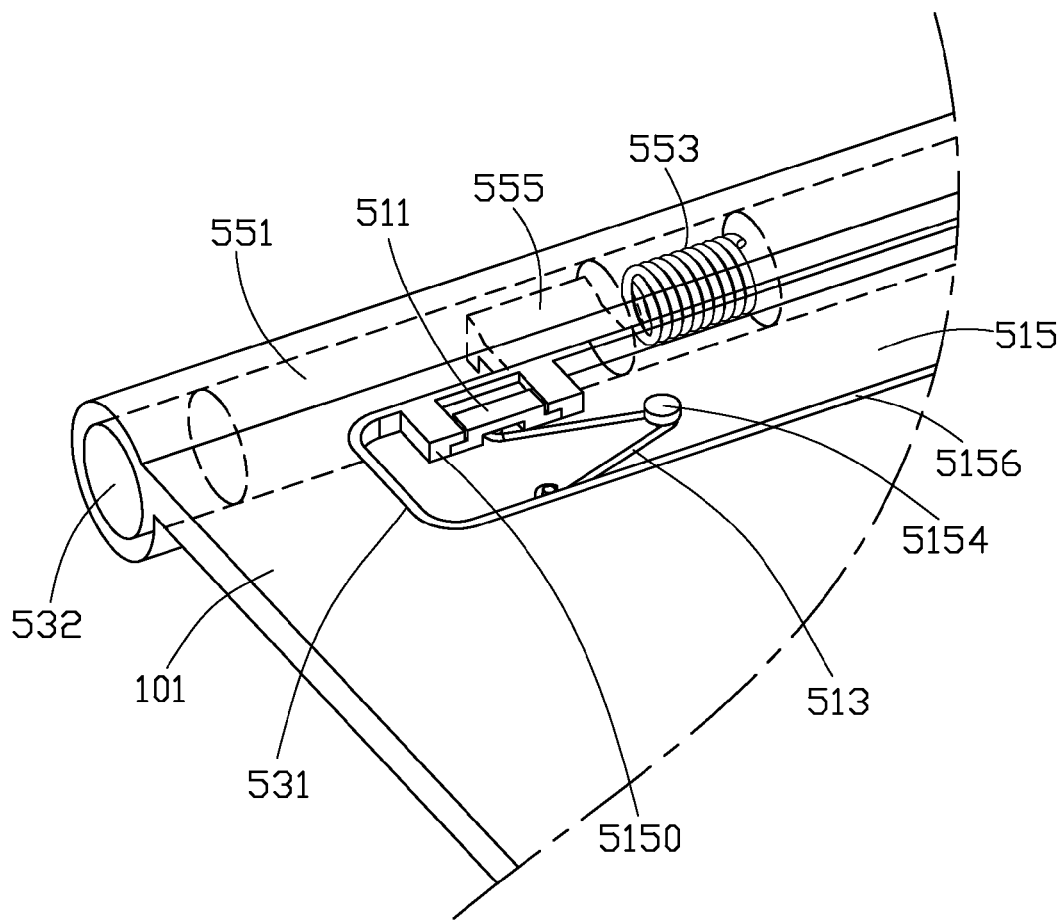
FIG. 8 shows the foldable keyboard of FIG. 4, unlocked.

Referring also to FIGS. 7-8, to lock the foldable keyboard 100 in a position when the foldable keyboard 100 is folded along the hinge portion 30, the magnet 41 attracts the metal sheet 43 to secure the cover 20 onto the main body 10. When the keyboard 100 is folded along the first hinge portion 13 and the second hinge portion 23, the locking portion 51 is received into the recessed portion 531. The magnet 555 placed in the sliding groove 533 corresponds to the limiting slot 535, so that, the bottom 5113 of the sliding block 511 will be attracted by the magnet 555 (here acting as an external magnetic force) to move towards the slot 5153 until the portion of the bottom 5113 passes through the slot 5153, and the stopper 5115 butts against the sidewall 5156, thereby engaging the locking portion 51 in the limiting portion 53. Furthermore, after the locking portion 51 is engaged in the limiting portion 53, the two sub-main bodies 101 and 103 are locked together and the two sub-covers 201 and 203 are locked together, thereby locking the foldable keyboard 100 in the second folding state. During the movement of the bottom 5113 of the sliding block 511, the first elastic element 513 is deformed.

To unlock the foldable keyboard 100, the button 551 is pressed by the user to compress the second elastic element 553, causing the magnet 555 to slide along the sliding groove 533. When the magnet 555 slides over a position of the sliding groove 533, corresponds to the limiting slot 535, the magnetic force from the magnet 555 experienced by the sliding block 511 ceases, and the first elastic element 513 rebounds to drive the sliding block 511 to the original position. The bottom 5113 is moved out of the limiting slot 535, thereby causing disengagement of the locking portion 51 and the recessed portion 531. Thus, the two sub-main bodies 101 and 103 are unlocked, and the two sub-covers 201 and 203 are unlocked, and the keyboard 100 itself becomes unlocked.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A foldable keyboard comprising:
   a main body comprising a key portion comprising a plurality of keys, wherein a receiving chamber is defined in a side of the main body;
   a cover comprising a plurality of receiving grooves aligned with the plurality of keys, wherein when the cove is rotatably engaged on the main body, the plurality of keys is received in the corresponding receiving grooves;
   a first hinge portion mounted on a middle position of the main body; and
   a locking element comprising:
      a locking portion mounted on the main body, wherein the locking portion comprises a sliding block, a fixing portion, and a first elastic element for elastically connecting the sliding block to the fixing portion, the fixing portion defines a slot in a sidewall thereof, the sliding block comprises a bottom, a stopper protruding from a portion of the bottom, and a first pin mounted on the stopper, the fixing portion further comprises a groove, two sliding tracks protruding from a bottom of the groove, a second pin, and a third pin, the slot is defined in a sidewall of the groove between the two sliding tracks, a first receiving space is defined between the two sliding tracks, a sidewall of the sliding track is recessed to form a second receiving space communicating with the first receiving space, two ends of the bottom of the sliding block are placed in the second receiving spaces, the stopper is placed in the first receiving space, thereby slidably connecting the sliding block to the fixing portion;
      a limiting portion mounted on the main body, wherein the limiting portion comprises a recessed portion defined in a surface of the main body for receiving the locking portion, the recessed portion defines a limiting slot communicating with the slot in a sidewall thereof, the sliding block is attractable by an external magnetic force to move towards the slot until a portion of the sliding block passes through the slot, and is engaged in the limiting slot, the first elastic element is deformed, thereby engaging the locking portion in the limiting portion; and
      a controlling portion mounted on the main body, and received in the receiving chamber;
      wherein the main body is operable to be folded along the first hinge portion, the locking portion is operable to engage in the limiting portion to lock the foldable keyboard in a folding state, and the controlling portion is configured to unlock the foldable keyboard from a folding state.

2. The foldable keyboard as described in claim 1, wherein when the external magnetic force disappears, the first elastic element rebounds to drive the sliding block to return to an original position, thereby unlocking the foldable keyboard from the folding state.

3. The foldable keyboard as described in claim 1, wherein the first elastic element is a spring.

4. The foldable keyboard as described in claim 1, wherein the sliding block is a magnet.

5. The foldable keyboard as described in claim 1, wherein the first elastic element comprises a first fixing end, a second fixing end, and a third fixing end, the first fixing end is fixed to the first pin, the second fixing end is fixed to the second pin, and the third fixing end is fixed to the third pin, thereby elastically connecting the sliding block to the fixing portion.

6. The foldable keyboard as described in claim 5, wherein the controlling element comprises a button, a magnet and a second elastic element, the receiving chamber comprises a sliding groove therein, when the foldable keyboard is folded along the first hinge portion, the sliding block is attracted by the magnet to move towards the slot until the portion of the bottom passes through the slot, and the stopper butts against the sidewall of the fixing portion, thereby engaging the locking portion in the limiting portion.

7. The foldable keyboard as described in claim 6, wherein when the magnet is slid over a position of the sliding groove, which corresponds to the limiting slot by the button and the second elastic element, the magnetic force from the magnet applied on the bottom of the sliding block disappears, the first elastic element rebounds to drive the sliding block to return to the original position, the bottom is moved out of the limiting slot, thereby unlocking the foldable keyboard from the folding state.

8. The foldable keyboard as described in claim 6, wherein the second elastic element is a spring.

9. The foldable keyboard as described in claim 1, further comprising a hinge portion rotatably connecting the cover to the main body, and a fixing element, wherein the foldable keyboard is folded along the hinge portion, and is locked by the fixing element in the folding state.

10. The foldable keyboard as described in claim 9, wherein the fixing element comprises a magnet mounted on the cover, and a metal sheet mounted on the main body, the magnet attracts the metal sheet to secure the cover on the main body, thereby locking the foldable keyboard in the folding state.

11. The foldable keyboard as described in claim 9, further comprising a second hinge portion, the cover is folded along the second hinge portion.

12. The foldable keyboard as described in claim 9, wherein the cover is made of flexible material.

* * * * *